United States Patent Office 3,535,315
Patented Oct. 20, 1970

3,535,315
AMINOALKYL DERIVATIVES OF 6,11-DIHYDRO-
DIBENZO-[b,e]-OXEPINE AND -THIEPINE
Werner Winter and Max Thiel, Mannheim, Kurt Stach,
Wolfgang Schaumann and Karl Dietmann, Mannheim-
Waldhof, Germany, assignors to Boehringer Mannheim
Gesellschaft mit beschrankter Haftung
No Drawing. Filed May 29, 1967, Ser. No. 642,186
Claims priority, application Germany, July 14, 1966,
B 88,001
Int. Cl. A61k 27/00; C07d 9/00, 67/00
U.S. Cl. 260—240           7 Claims

ABSTRACT OF THE DISCLOSURE

Novel aminoalkyl derivatives of 6,11-dihydrodibenzo-
[b,e]-oxepine and -thiepine are disclosed having the
formula:

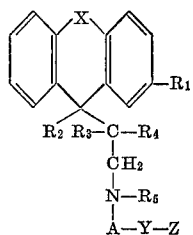

wherein X is oxymethylene or thiamethylene, $R_1$ is hydrogen, halogen, alkyl, alkoxy or trifluoromethyl, $R_2$ is hydrogen or hydroxyl, $R_3$ is hydrogen or together with $R_2$ represents a further valency bond, $R_4$ and $R_5$, which may be the same or different, are each hydrogen or lower alkyl, A is alkylene and can be substituted by alkyl or aryl and can, when Y represents a valency bond, be substituted by hydroxyl or acylated hydroxyl, Y is a valency bond, an oxygen or sulfur atom or an imino group which can be alkylated and Z is aryl, aralkyl or cycloalkyl and such groups substituted by halogen, hydroxyl, alkoxy, alkyl or trifluoromethyl. The aforesaid compounds and the acid addition salts thereof with pharmaceutically acceptable acids have been found to exhibit valuable cardiac and circulatory activities.

---

This invention relates to novel chemical compounds and methods of preparing and using the same. More particularly the invention is concerned with novel aminoalkyl derivatives of 6,11-dihydro-dibenzo-[b,e]-oxepine and -thiepine and with processes for the preparation and use thereof.

According to the present invention, there is provided a novel class of aminoalkyl derivatives of the formula:

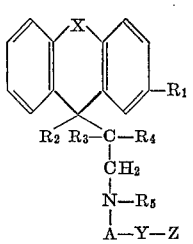  (I)

and the salts thereof with pharmacologically acceptable acids wherein X is an oxymethylene or thiamethylene group, $R_1$ is hydrogen or halogen or an alkyl, alkoxy or trifluoromethyl group, $R_2$ is hydrogen or a hydroxyl group, $R_3$ is hydrogen or, together with $R_2$, represents a further valency bond, $R_4$ and $R_5$, which may be the same or different, are each a member of the group of hydrogen and lower alkyl, A is an alkylene chain, which may be substituted by an alkyl or aryl group and which, when Y represents a valency bond, can also be substituted by a hydroxyl group or an acylated hydroxyl group. Y represents a valency bond or an oxygen or sulfur atom or an imino group, which may be alkylated, and Z is an aryl, aralkyl or cycloalkyl group which may be substituted by halogen, hydroxyl, alkoxy, alkyl or trifluoromethyl groups.

These novel compounds constitute valuable therapeutic agents and are possessed of valuable cardiac and circulatory properties exhibiting vaso dilating and circulation stimulating activities.

The new compounds according to the present invention can be prepared by condensing, in the conventional manner, a dibenzo-oxepine or -thiepine derivative of the formula:

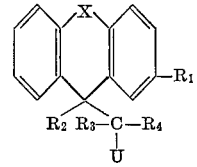  (II)

with a compound of the formula W—A'—Y—Z (III), in which one of the substituents U and W represents the group

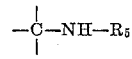

and the other substituent represents a carbonyl or carboxyl function and $R_1$, $R_2$, $R_3$, $R_4$, $R_5$, X, Y and Z have the same significance as above disclosed and A' is an alkylene chain which contains one carbon atom less than A. The intermediate products thereby obtained are then reduced. Thereafter the compound (I) obtained, insofar as $R_5$ is a hydrogen atom, can be, if desired, alkylated in the conventional manner on the nitrogen atom and, if desired, converted into the corresponding salt.

Thus, for preparing the new compounds of the present invention, an amine of, for example, the formula:

$$R_5\text{—NH—A—Y—Z} \quad (\text{IIIa})$$

in which $R_5$, A, Y and Z are as above defined, is condensed with an aldehyde of the formula:

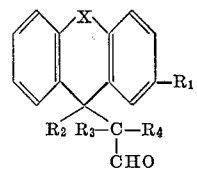  (IIa)

in which $R_1$, $R_2$, $R_3$, $R_4$ and X are as above defined, or with a reactive derivative of the corresponding carboxylic acid having the formula:

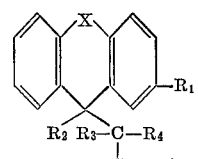  (IIa')

in which $R_1$, $R_2$, $R_3$, $R_4$ and X are as defined above.

However, it is also possible to condense an amine of the formula:

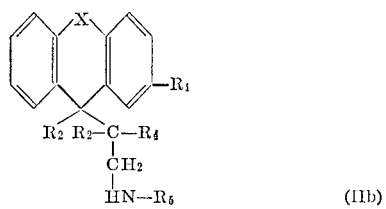

(IIb)

in which $R_1$, $R_2$, $R_3$, $R_4$, $R_5$ and X have the same significances as above set out, with an aldehyde of the formula:

$$OHC-A'-Y-Z \quad (IIIb)$$

in which A', Y and Z are as above defined, or with a corresponding ketone or carboxylic acid derivative thereof.

As reactive carboxylic acid derivatives, it is preferred to use the acid halides.

The reaction of compounds (II) and (III) is carried out by heating in an inert solvent, suitable condensation agents advantageously being added, i.e., care is taken, in the conventional manner, that the water split off by the reaction is removed, or bases, such as an excess of the amine (IIIa), are added to combine with the hydrogen halide which is split off in the reaction.

The azomethines or acid amides formed in the first stage of the process are thereafter reduced in the known manner to the compounds (I). For this purpose, it is preferred to use complex metal hydrides, such as lithium aluminum hydride or sodium borohydride, or to employ a catalytic hydrogenation. An advantageous variant of the process consists in the combination of the condensation of the compounds (IIa) and (IIIa) or (IIb) and (IIIb) with the subsequent reduction, i.e., the carbonyl compounds are reduced in the presence of the amines.

The subsequent N-alkylation of the compounds having the Formula I in which $R_5$ is a hydrogen atom, can be carried out in the usual way, for example, by catalytic hydrogenation in the presence of a suitable aldehyde, by acylation and subsequent reduction using complex metal hydrides or by reaction with an appropriate alkyl halide.

The basic compounds (I) can, if desired, be converted, in the conventional manner, into their corresponding acid addition salts using therefor inorganic or organic acids. Instances of suitable inorganic acids which can be used, include hydrogen halides, sulfuric acid and phosphoric acid, and instances of organic acids include, for example, acetic acid, lactic acid, maleic acid, tartaric acid and citric acid.

The aldehydes having the Formula IIa set out above as starting materials can be obtained, for example, by the ethynylation of ketones of the formula:

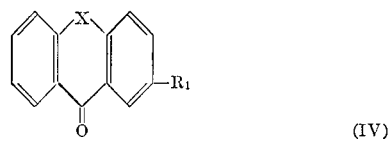

(IV)

in which $R_1$ and X have the same significances as given above, to produce carbinols of the formula:

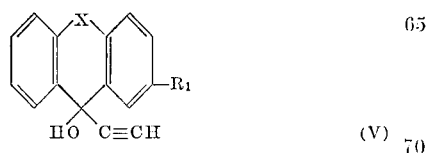

(V)

in which $R_1$ and X have the same meanings as above set out, followed by a Meyer-Schuster reaction.

In the case of the aldehydes (IIa) formed in this manner, $R_2$ and $R_3$ together form a further valency bond. Aldehydes of the Formula IIa in which $R_2$ and $R_3$ each represent a hydrogen atom, can be obtained, under alkaline reaction conditions, by the reaction of a cyclic diphenyl-methane derivative of the formula:

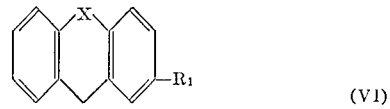

(VI)

in which $R_1$ and X have the same meanings as given above, with an acetal of chloroacetaldehyde, whereby there are formed intermediates of the formula:

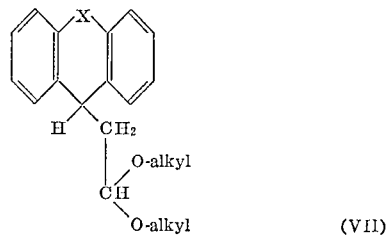

(VII)

in which $R_1$ and X have the same meanings as set out above.

The carboxylic acids having structural Formula IIa' required as starting materials can be obtained, for example, by the reaction of a ketone of Formula IV with a fatty acid ester, such as for instance, tert.-butyl acetate, in the presence of an alkaline condensation agent. There are thusly obtained, as intermediates, hydroxy-esters of the formula:

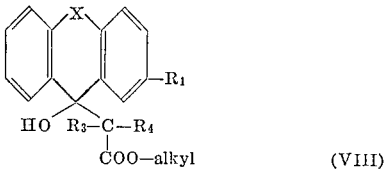

(VIII)

in which $R_1$, $R_3$, $R_4$ and X have the same significance as set out above, which, by careful acidic hydrolysis, can be converted into the desired carboxylic acids having Formula IIa', in which $R_2$ is a hydroxyl group. If a more vigorous hydrolysis is carried out, for example, with glacial acetic acid or 6 N hydrochloric acid, there is achieved a splitting off of the elements of water and saponification takes place, with the formation of carboxylic acids having the Formula IIa', in which $R_2$ and $R_3$ together form an additional valency bond. Finally, it is also possible to first bring about the splitting off of the elements of water under anhydrous conditions, for example, with alcoholic hydrochloric acid, followed by reduction of the carbon-carbon double bond, for example, with amalgamated aluminum, and thereafter, under aqueous acidic reaction conditions, to prepare, by saponification, the carboxylic acids of the Formula IIa', in which $R_2$ and $R_3$ are both hydrogen atoms.

The amines of Formula IIb required as starting materials can be prepared by reducing in a known manner, compounds of the general formula

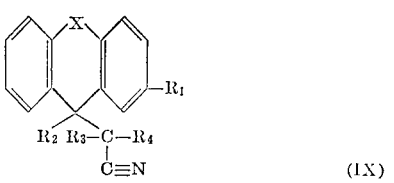

(IX)

in which $R_1$, $R_2$, $R_3$, $R_4$ and X have the same significances as set out above and the compounds obtained of the general Formula IIb, in the case in which $R_2$ is a hydroxyl group, then, if desired, subsequently dehydrated or, in the case in which $R_2$ and $R_3$ represent an additional valency bond, then, if desired, subsequently hydrogenated. In the case in which in the substances of Formula IIb, $R_5$ is a lower alkyl group, this can be introduced by N-alkylation in the usual way, for example, by catalytic hydrogenation in the presence of a suitable aldehyde, by acylation and subsequent reduction using complex metal hydrides or by reaction with an appropriate alkyl halide.

The details of the present invention will become apparent to those skilled in the art from a consideration of the following examples which are given by way of illustration and without any intention that the invention be limited thereto.

EXAMPLE 1

N-[2-(6,11-dihydro-dibenzo-[b,e]-oxepine-11-yl)-ethyl]-1-phenyl-2-amino-propane 5.5 g. 11-(2-amino-ethyl)-6,11-dihydro-dibenzo-[b,e]-oxepine (0.23 mol) were heated for one hour, under use of a water separator, with 4.7 g. phenyl-acetone (0.035 mol) in 75 ml. benzene. The reaction mixture was thereafter evaporated, the residue taken up in 75 ml. methanol and the azo-methine obtained reduced by adding, in two portions, a total of 2.27 g. sodium borohydride (0.06 mol). After stirring for half an hour under reflux, the solvent was evaporated off. Following the addition of water, the residue was extracted with ether. Following drying of the ethereal solution, there was precipitated out from the ethereal solution, the hydrochloride of N-[2-(6,11 - dihydro-dibenzo-[b,e] - oxepine-11-yl) - ethyl]-1-phenyl-2-amino-propane, which could be recrystallized from isopropanol. The said hydrochloride compound, had a melting point of 211–212° C., and was obtained in a yield of 6.8 g. (75.6% of theory).

The compounds set out in the following table were obtained in an analogous manner:

TABLE

| Compound | Base B.P., ° C. | Salt M.P., ° C. | Yield, percent |
| --- | --- | --- | --- |
| N-[2-(6,11-dihydro-dibenzo-[b,e]-oxepine-11-yl)-ethyl]-1-phenyl-1-amino-ethane. | | 238–240 hydrochloride. | 85 |
| N-[2-(6,11-dihydro-dibenzo-[b,e]-oxepine-11-yl)-ethyl]-1-(2-methoxy-phenyl)2-amino-propane. | 228–232/0.15 | | 68 |
| N-[2-(6,11-dihydro-dibenzo-[b,e]-oxepine-11-yl)-ethyl]-1-(3-hydroxy-phenyl)-1-aminoethane. | | Amorphous hydrochloride. | 69 |
| N-[2-(6,11-dihydro-dibenzo-[b,e]-oxepine-11-yl)-ethyl]-1-(2-hydroxy-phenyl)-1-amino-propane. | | 226–227° hydrochloride. | 89 |
| N-[(6,11-dihydro-dibenzo-[b,e]-oxepine-11-yl)-ethyl]-1-phenyl-3-amino-butane. | | 154–155 maleate. | 90 |
| N-[(6,11-dihydro-dibenzo-[b,e]-oxepine-11-yl)-ethyl]-1-(3-methoxy-phenyl)-2-amino-propane. | | 137 maleate. | 86 |
| N-[(6,11-dihydro-dibenzo-[b,e]-oxepine-11-yl)-ethyl]-1-phenyl-2-amino-pentane. | | 165–166 maleate. | 80 |
| N-[(6,11-dihydro-dibenzo-[b,e]-oxepine-11-yl)-ethyl]-1-phenyl-3-methyl-2-amino-butane. | | 239–240 hydrochloride. | 63 |
| N-[(6,11-dihydro-dibenzo-[b,e]-oxepine-11-yl)-ethyl]-1,2-diphenyl-1-hydroxy-2-amino-ethane. | M.P., 164–165 | | 93 |
| N-[(6,11-dihydro-dibenzo-[b,e]-oxepine-11-yl)-ethyl]-1,2-diphenyl-2-amino-ethane. | 245–250/0.6 | 156–157 maleate. | 81 |
| N-[(6,11-dihydro-dibenzo-[b,e]-oxepine-11-yl)-ethyl]-1-phenyl-2-amino-hexane. | | 172–173 maleate. | 88 |
| N-[1-(6,11-dihydro-dibenzo-[b,e]-oxepine-11-yl)-butyl-2]-1-pheyl-2-amino-propane. | 220–228/0.1 | | 62 |
| N-[2-(6,11-dihydro-dibenzo-[b,e]-oxepine-11-yl)-ethyl]-1-(3,4-dimethoxy-phenyl)-2-amino-propane. | | 118–120 maleate. | 65 |
| N-[2-(6,11-dihydro-dibenzo-[b,e]-oxepine-11-yl)-ethyl]-1-(4-methoxy-phenyl)-2-amino-propane. | | 204–205 hydrochloride. | 63 |
| N-[2-(6,11-dihydro-dibenzo-[b,e]-oxepine-11-yl)-ethyl]-1-(4-hydroxy-3-methoxy-pheyl)-2-amino-propane. | | 235–236 hydrochloride. | 74 |
| N-[2-(2-methyl-6,11-dihydro-dibenzo-[b,e]-oxepine-11-yl)-ethyl]-1-phenyl-2-amino-propane. | 230–234/0.3 | | 72 |
| N-[2-(2-methoxy-6,11-dihydro-dibenzo-[b,e]-oxepine-11-yl)-ethyl]-1-phenyl-2-amino-propane. | 230–232/0.3 | | 76 |
| N-[2-(2-chloro-6,11-dihydro-dibenzo-[b,e]-oxepine-11-yl)-ethyl]-1-phenyl-2-amino-propane. | | 225–226 hydrochloride. | 62 |
| N-[2-(6,11-dihydro-dibenzo-[b,e]-oxepine-11-yl)-ethyl]-1-phenoxy-2-amino-propane. | 220–222/0.2 | 145 maleate. | 52 |
| N-[2-(6,11-dihydro-dibenzo-[b,e]-oxepine-11-yl)-ethyl]-1-phenyl-1-amino-propane. | | 249–251 hydrochloride. | 83 |
| N-[2-(2-methoxy-6,11-dihydro-dibenzo-[b,e]-oxepine-11-yl)-ethyl]-1-phenyl-1-amino-propane. | 212–220/0.1 | | 65 |
| N-[2-(6-11-dihydro-dibenzo-[b,e]-thiepine-11-ylidene)-ethyl]-1-phenyl-2-amino-propane. | | 234–235 hydrochloride. | 71 |
| N-[2-(6,11-dihydro-dibenzo-[b,e]-thiepine-11-yl)-1-ethyl]-1-phenyl-2-amino-propane. | | 257–258 hydrochloride. | 70 |
| N-[2-(11-hydroxy-6,11-dihydro-dibenzo-[b,e]-oxepine-11-yl)-ethyl]-1-1phenyl-2-amino-propane. | | 147–148 maleate. | 76 |
| N-[2-(6,11-dihydro-dibenzo-[b,e]-oxepine-11-ylidene)-ethyl]-1-phenyl-3-amino-propane. | | 163–164 hydrochloride. | 65 |

EXAMPLE 2 d,l-threo-N-[2-(6,11-dihydro-dizenzo-[b,e]-oxepine-11-ylidene)-ethyl]-1-phenyl-1-hydroxy-2-amino-propane 11.8 g. 6,11-dihydro-dibenzo-[b,e]-oxepine-11-ylidene-acetaldehyde (0.05 mol) were heated with 7.5 g. nor-pseudoephedrine (0.05 mol) in 75 ml. benzene, the water formed thereby, being simultaneously distilled off azeotropically. After evaporation of the solvent, the residue was taken up in 75 ml. methanol and reduced by the portionwise addition of 5.67 g. (0.15 mol) sodium borohydride. After heating under reflux for one hour, the solvent was substantially completely distilled off. The residue was then mixed with 200 ml. water, extracted with ether, the etheral solution dried, the solvent evaporated off and the residue recrystallized from isopropanol. There were thusly obtained 14.2 g. (76% of theory) d,l-threo-N-[2-(6,11 - dihydro - dibenzo - [b,e] - oxepine-11-ylidene)-ethyl]-1-phenyl-1-hydroxy-2-amino - propane, which had a melting point of 131–132° C.

The 6,11-dihydro-dibenzo-[b,e]-oxepine - 11 - ylidene-acetaldehyde used as starting material was obtained by the rearrangement of 11 - hydroxy - 11 - ethynyl-6,11-dihydro - dibenzo - [b,e] - oxepine (M.P. 83–94° C.; obtained by the reaction of 6,11 - dihydro - dibenzo - [b,e]-oxepine-11-one with acetylene and sodium in liquid ammonia) in an aqueous alcoholic solution of sulfuric acid. The reaction time therefore amounted to 30 minutes. The compound was obtained in a yield of 82% and had a boiling point of 177–179° C./0.6 mm. Hg.

The following compounds were obtained in an analogous manner: d,l-erythro-N-[2-(6,11-dihydro-dibenzo-[b,e]-oxepine-11-ylidene)-ethyl]-1-phenyl - 1 - hydroxy - 2-amino-propane; M.P. 107–108° C.; hydrochloride M.P. 243° C.; yield 68% of theory; and N-[2-(6,11-dihydro-dibenzo - [b,e] - oxepine - 11 - ylidene)-ethyl]-1-phenyl-2-amino-propane; B.P. 217–219° C./0.3 mm. Hg.; hydrochloride M.P. 234° C; yield 88% of theory

EXAMPLE 3 d-threo - N-[2 - (6,11 - dihydro-dibenzo-[b,e] - oxepine - 11-yl) - ethyl] - N - methyl - 1 - phenyl - 1 - hydroxy - 2-amino-propane.

19 g. 6,11-dihydro-dibenzo-[b,e]-oxepine-11-yl-acetic acid (0.075 mol) were boiled for three hours with 11 ml. thionyl chloride (0.15 mol) in 100 ml. chloroform. The reaction mixture was subsequently evaporated in order to drive off the excess thionyl chloride and thereafter mixed with 33 g. d-pseudo-ephedrine (0.2 mol) in 100 ml. chloroform. The resulting mixture was then boiled for four hours. Any precipitated pseudoephedrine hydrochloride was filtered off with suction. The filtrate was then extracted with dilute hydrochloric acid and water, dried and evaporated.

The oily residue of N-(6,11-dihydro-dibenzo-[b,e]-oxepine-11-yl)-acetyl-pseudoephedrine was established as being a chromatographically homogeneous substance and was further worked up in this form. The latter compound was obtained in a yield of 28.7 g. (95.6% of theory).

22 g. of the above-described amide (0.055 mol) were warmed for four hours at 40° C. in 200 ml. tetrahydrofuran and 100 ml. ether with 3.13 g. lithium aluminum hydride (0.0825 mol). The reaction mixture was thereafter decomposed by means of a saturated, aqueous solution of sodium chloride. The precipitated hydroxides were filtered off with suction and the filtrate evaporated in a vacuum. The resultant residue was taken up in ether and mixed with etheral hydrochloric acid. There were obtained 14 g. (60% of theory) of an amorphous hydrochloride of d-threo-N-[2-(6,11-dihydro - dibenzo - [b,e]-oxepine-11-yl)-ethyl]-N-methyl-1phenyl-1 - hydroxy - 2 - amino-propane. The base which was liberated therefrom with sodium hydroxide solution could be distilled in a high vacuum; B.P. 226–228° C./0.2 mm. Hg.

For the preparation of the 6,11-dihydro-dibenzo[b,e]-oxepine-11-yl-acetic acid used as starting material, the following procedure was employed:

6,11-dihydro-dibenzo-[b,e]-oxepine-11-one was reacted for two hours with tert.-buytl acetate in the presence of diethylamino-magnesium bromide as condensation agent and in ethereal solution. There was obtained 11-hydroxy-6,11 - dihydro - dibenzo - [b,e]-oxepine-11-yl-acetic acid tert.-butyl ester having a melting point of 87–88° C., in a yield of 92% of theory. By warming this hydroxy compound for three hours at 40° C. in glacial acetic acid, with the addition of 48% hydrobromic acid, there was recovered, in 80% yield, 6,11 - dihydro - dibenzo - [b,e]-oxepine-11-ylidene-acetic acid having a melting point of 182–183° C. If, instead of the glacial acetic acid-hydrobromic acid mixture,there was used alcoholic hydrochloric acid, then 6,11-dihydro-dibenzo-[b,e]-oxepine-11-ylidene-acetic acid tert.-butyl ester, having a melting point of 85–86° C., was obtained in a yield of 75–85%.

By reduction of the above-mentioned unsaturated compound with amalgamated aluminum and water in ethereal solution, there was obtained 6,11 - dihydro - dibenzo-[b,e]-oxepine-11-yl-acetic acid tert.-butyl ester, which had a boiling point of 160–163° C./0.2 mm. Hg., in a yield of about 90% of theory. The ester was saponified for 2 hours at 90° C. with a mixture of glacial acetic acid and 6 N hydrochloric acid (10:1), and there was obtained, in 88–95% yield, 6,11 - dihydro - dibenzo-[b,e]-oxepine-11-yl-acetic acid having a melting point of 114–115° C.

In an analogous manner, there was obtained, with the use of 1-ephedrine, 1-erythro-N-[2-(6,11-dihydro-dibenzo-[b,e]-oxepine-11-yl)-ethyl] - N - methyl - 1 - phenyl - 1 - hydroxy-2-amino-propane; B.P. 236–240° C./0.1 mm. Hg.; yield 65% of theory. By heating for two hours in acetic anhydride at 100° C., there could be obtained therefrom the 1-acetoxy compound; B.P. 227–228° C./0.1 mm. Hg.; yield 56% of theory; as well as the following compounds: d,l - erythro - N - [2-(6,11-dihydro-dibenzo-[b,e]-oxepine-11-yl)ethyl] - N - methyl - 1 - phenyl - 1 - hydroxy - 2 - amino - propane; B.P. 244–246° C./0.1 mm. Hg.; yield 63% of theory; d,l-threo-N-[2-(6,11 - dihydro-dibenzo - [b,e] - oxepine - 11 - yl) - ethyl] - N - methyl-1-phenyl-1-hydroxy-2-amino-propane; B.P. 236–239° C./0.3 mm. Hg.; yield 68% of theory; 1-erythro-N-[2-(6,11-dihydro - dibenzo - [b,e] - oxepine - 11 - ylidene)-ethyl]-1-phenyl-1-hydroxy-2-amino-propane; M.P. of the hydrochloride 194° C. (decomp.); yield 43% of theory; 1-erythro - N - [2 - (6,11 - dihydro - dibenzo - [b,e]-oxepine-11-yl)-ethyl]-1phenyl-1-hydroxy-2 - amino - propane; M.P. 87–88° C.; yield 65% of theory.

In order to confirm the pharmacological properties i.e., vaso dilating and circulation stimulating activities a series of tests as hereinafter set out were conducted. As there is no known structurally related compound having the same type of activity, the known compound Complamin (Xantinolnicotinate=7-[2-hydroxy-3-(N-methyl-β-hydroxyethylamino)-propyl]-theophylline) was employed as the comparison compound. The object of the procedures was to establish whether the test compounds increased the circulatory blood minute volume and thus whether the test compounds acted to stimulate the peripheral blood circulation to the organs. Primarily the blood supply to the heart is to be increased; peripheral vasodilatation taking place only to the extent to which the blood supply is increased so that no decrease in the arterial pressure occurs, as is to be expected when pure vasodilators are employed.

A criterion for the evaluation of the test compounds employed is the maximum increase in the blood minute volume in the aorta in dogs and the unanesthetized state following oral application of the test compounds.

Test procedure.—Test procedures were carried out on dogs in the unanesthetized i.e. awake condition using electromagnetic flow meters, which had been implanted in the aorta ascendens. The mechanical zero line was determined by simultaneously implanted sealing flaps or alternatively by means of an exact adjustment of an electronic gate of the electro flow meter. The test compound was administered by means of a stomach tube. All the compounds employed were dissolved in 10 ml. of distilled water to which there had been added LUTROL 9 (polyethyleneoxide—molecular weight about 400).

The dosages were varied. In some instances low dosages were employed and there was determined whether higher dosages would possibly be effective for the intended purpose. The compounds which were employed in the test are the following:

A—N-[2-(6,11-dihydro-dibenzo-[b,e]-oxepine-11-yl)-ethyl]-1-phenyl-2-aminopropane.

B—N-[2-(6,11-dihydro-dibenzo-[b,e]-oxepine-11-yl)-ethyl]-1-(4-hydroxy-3-methoxy-phenyl)-2-aminopropane.

C—d,l-threo-N-[2-(6,11-dihydro-dibenzo-[b,e]-oxepine-11-ylidene)-ethyl]-1-phenyl-1-hydroxy-2-aminopropane.

D—d,l-erythro-N-[2-(6,11-dihydro-dibenzo-[b,e]-oxepine-11-ylidene)-ethyl]-1-phenyl-1-hydroxy-2-amino-propane.

E—d-threo-N-[2-(6,11-dihydro-dibenzo-[b,e]-oxepine-11-yl)-ethyl]-N-methyl-1-phenyl-1-hydroxy-2-aminopropane.

F—1-erythro-N-[2-(6,11-dihydro-dibenzo-[b,e]-oxepine-11-yl)-ethyl]-N-methyl-1-phenyl-1-hydroxy-2-aminopropane.

G—N-[2-(2-methyl-6,11-dihydro-dibenzo-[b,e]-oxepine-11-yl)-ethyl]-1-phenyl-2-amino-propane.

H—N-[2-(2-methoxy-6,11-dihydro-dibenzo-[b,e]-oxepine-11-yl)-ethyl]-1-phenyl-2-amino-propane.

I—1-erythro-N-[2-(6,11-dihydro-dibenzo-[b,e]-oxepine-11-yl)-ethyl]-N-methyl-1-phenyl-1-acetoxy-2-aminopropane.

J—N-[2-(6,11-dihydro-dibenzo-[b,e]oxepine-11-yl)-ethyl]-1-(2-hydroxy-phenyl)-1-amino-propane.

K—N-[(6,11-dihydro-dibenzo-[b,e]-oxepine-11-yl)-ethyl]-1-(3-methoxy-phenyl)-2-amino-propane.

L—N-[(6,11-dihydro-dibenzo-[b,e]-oxepine-11-yl)-ethyl]-1-phenyl-3-methyl-2-amino-butane.

M—N-[(6,11-dihydro-dibenzo-[b,e]-oxepine-11-yl)-ethyl]-1-phenyl-2-amino-hexane.

N—N-[2-(6,11-dihydro-dibenzo-[b,e]-thiepine-11-ylidene)-1-ethyl]-1-phenyl-2-amino-propane.

O—d,l-threo-N-[2-(6,11-dihydro-dibenzo-[b,e]-oxepine-11-yl)-ethyl]-N-methyl-1-phenyl-1-hydroxy-2-amino-propane.

P—N-[2-(11-hydroxy-6,11-dihydro-dibenzo-[b,e]-oxepine-11-yl)-ethyl]-1-phenyl-2-amino-propane.

Q—N-[2-(6,11-dihydro-dibenzo-[b,e]-thiepine-11-yl)-ethyl]-1-phenyl-2-amino-propane.

R—N-[2-(6,11-dihydro-dibenzo-[b,e]-oxepine-11-ylidene)-ethyl]-1-phenyl-3-amino-propane.

S—1-erythro-N-[2-(6,11-dihydro-dibenzo-[b,e]-oxepine-11-ylidene)-ethyl]-1-phenyl-1-hydroxy-2-amino propane.

T—1-erythro-N-[2-(6,11-dihydro-dibenzo-[b,e]-oxepine-11-yl)-ethyl]-1-phenyl-1-hydroxy-2-amino-propane.

The results of the tests are set out in the following table:

TABLE.—INCREASE OF THE BLOOD MINUTE VOLUME IN THE AORTA OF UNANESTHETIZED DOGS MEASURED WITH CHRONICALLY IMPLANTED ELECTRO-MAGNETIC FLOWMETERS

| Compound | Oral dose, mg./kg. | Increased [1] |
|---|---|---|
| Xantinol-nicotinate | 25.0 | 110 |
| A | 5.0 | 140 |
| B | 0.5 | 168 |
| C | 0.5 | 130 |
| D | 0.5 | 240 |
| E | 0.5 | 140 |
| F | 0.5 | 240 |
| G | 0.5 | 120 |
| H | 0.5 | 120 |
| I | 1.0 | 160 |
| J | 0.5 | 130 |
| K | 2.0 | 160 |
| L | 0.5 | 130 |
| M | 0.5 | 120 |
| N | 0.5 | 115 |
| O | 0.5 | 175 |
| P | 0.5 | 115 |
| Q | 0.5 | 140 |
| R | 0.5 | 132 |
| S | 0.5 | 170 |
| T | 0.5 | 210 |

[1] Max. increase of the blood, minute vol. in percent referred to the control (=100%).

As can be seen from the above table, 25.0 mg./kg. Xantinolnicotinate administered orally, resulted in an increase of the heart minute volume of from 100 to 110%. This increase in heart minute volume was reproducible in a number of identically carried out tests so that it could be taken as the comparison or control value. The novel compounds in accordance with the invention produced an increase in the blood minute volume which in each instance is greater than that increase effected by the Xantinolnicotinate. In some instances the increase exceeded 100% and in all instances the does of compound in accordance with the invention was 1 to 2 powers of ten lower than the dose of the comparison compound Xantinolnicotinate.

Pharmaceutically acceptable acid addition salts of the present invention can be prepared from the amino alkyl derivatives of 6,11-dihydro-dibenzo-[b,e]-oxepine and thiepine derivatives by conventional methods. For example, the free base can be dissolved in an aqueous solution of the appropriate acid and the salt can be isolated by evaporation of the solution. Alternatively, the free base dissolved in an organic solvent such as methanol, ethanol, ethylacetate, ether and the like, can be treated with the appropriate acid and according to the nature of the solvent employed, the desired salt will separate spontaneously or can be precipitated by the addition of a solvent in which the salt is insoluble. Suitable acids include hydrochloric, sulfuric, hydrobromic, phosphoric, tartaric, acetic, citric, succinic, maleic, benzoic, salicyclic and the like.

As indicated hereinbefore, the compounds of the present invention are useful for the treatment of conditions associated with cardiac and impaired circulatory phenomena and for this purpose the active compounds are associated with a pharmaceutically acceptable carrier in a form suitable for administration both perorally or parenterally.

For example, for oral administration the active compounds can be administered in liquid or solid dosage forms. Solid forms include capsules, tablets, powders, pills and the like and the liquid forms include suitably flavored aqueous suspensions and solutions (depending on concentration desired) and flavored oil suspensions and solutions wherein edible oils such as corn oil, cotton seed oil, coconut oil, peanut oil, sesame oil or mixtures of these and the like can be employed.

For preparing compounds such as tablets and other compressed formulations, the compounds can include any compatible and edible tableting material used in pharmaceutical practice as for example, corn starch, lactose, stearic acid, magnesium stearate, talc, methyl cellulose and the like.

Similarly, the compounds of the present invention can be mixed with suitable adjuvants for the preparation of resorbable hard gelatin or soft capsules utilizing conventional pharmaceutical practices.

Further, the compounds can be employed in the form of their solutions or suspensions suitable for parenteral administration.

The dosage of the novel compounds of the present invention for the treatment of the conditions as set out above, depends on the age, weight and condition of the patient being treated. Generally speaking, for adult oral administration, the preferred unit dosage is 1 mg.–50 mg. of active compound with a suitable pharmaceutical diluent and/or lubricant.

We claim:

1. A member selected from the group of amino alkyl derivatives of 6,11-dihydro-[b,e]-oxepine and -thiepine having the formula:

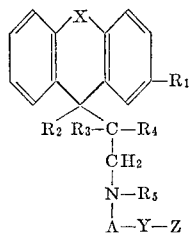

wherein X is a member selected from the group consisting of oxymethylene and thiamethylene, $R_1$ is a member selected from the group consisting of hydrogen, halogen, methyl, methoxy, and trifluoromethyl, $R_2$ is a member selected from the group consisting of hydrogen and hydroxyl, $R_3$ is a hydrogen atom, wherein $R_2$ and $R_3$ together with each other can represent a further valency bond, $R_4$ and $R_5$ are each selected from the group consisting of hydrogen and lower alkyl, A is a member selected from the group consisting of unsubstituted and substituted lower alkylene and wherein said substituent is a member selected from the group consisting of lower alkyl and phenyl wherein when Y represents a valency bond said substituent is a member selected from the group consisting of lower alkyl, phenyl, hydroxyl, and acetylated hydroxyl, Y is a member selected from the group consisting of oxygen and a valency bond and Z is a member selected from the group consisting of phenyl, and substituted phenyl, wherein said substitutent is a member selected from the group consisting of halogen, hydroxyl, methoxy, and trifluoromethyl; and non-toxic pharmaceutically acceptable salts thereof.

2. A compound according to claim 1 wherein said compound is designated d,l-erythro-N-[2-(6,11-dihydro-dibenzo-[b, e] - oxepine - 11-ylidene)-ethyl]-1-phenyl-1-hydroxy-2-aminopropane.

3. A compound according to claim 1 wherein said compound is designated 1 - erythro - N - [2-(6,11-dihydro-dibenzo - [b,e]-oxepine-11-yl)-ethyl]-N-methyl-1-phenyl-1-hydroxy-2-aminopropane.

4. A compound according to claim 1 wherein said compound is designated d,1 - threo-N-[2-(6,11-dihydro-dibenzo-[b,e]-oxepine-11-yl)-ethyl]-N-methyl-1 - phenyl-1-hydroxy-2-amino-propane.

5. A compound according to claim 1 wherein said compound is designated 1 - erythro - N - [2-(6,11-dihydro-dibenzo - [b,e] - oxepine - 11 - ylidene)-ethyl]-1-phenyl-1-hydroxy-2-aminopropane.

6. A compound according to claim 1 designated 1-erythro - N - [2-(6,11-dihydro-dibenzo-[b,e]-oxepine-11-yl)-ethyl]-1-phenyl-1-hydroxy-2-aminopropane.

7. A compound according to claim 1 in the form of its non-toxic pharmaceutically acceptable salt.

References Cited

Stoch et al.: Chem. Abs. 58:5679–80 (March 1963).

HENRY R. JILES, Primary Examiner

C. M. SHURKO, Assistant Examiner

U.S. Cl. X.R

260—327, 333, 488, 515, 516, 518, 519, 521, 544, 570.5, 570.7, 590, 599, 600; 424—275, 278

Boehr. 288
PF/ey
PO-1050
(5/69)

UNITED STATES PATENT OFFICE
CERTIFICATE OF CORRECTION

Patent No. 3,535,315      Dated October 20, 1970

Inventor(s) Werner Winter, Max Thiel, Kurt Stach, Wolfgang Schaumann and Karl Dietmann It is certified that error appears in the above-identified patent and that said Letters Patent are hereby corrected as shown below:

Column 7, line 1 of Example 2, "dizeno" should be --dibenzo--.

Column 10, line 36, "does" should be -- dose --.

Column 11, line 33, "Xis" should be -- X is --.

Column 6, last column of table, "70", third amount from bottom, should be moved down one line, to be opposite "hydrochloride".

Column 6, last column of table, "76", second line from bottom, should be moved down three lines, to be opposite "maleate".

SIGNED AND
SEALED
DEC 29 1970

(SEAL)
Attest:

Edward M. Fletcher, Jr.
Attesting Officer

WILLIAM E. SCHUYLER, JR.
Commissioner of Patents